United States Patent
Soriano, Jr. et al.

(10) Patent No.: US 10,113,101 B2
(45) Date of Patent: Oct. 30, 2018

(54) COMPOSITION AND METHOD FOR DISPERSING PARAFFINS IN CRUDE OILS

(71) Applicant: Ecolab USA Inc., Eagan, MN (US)

(72) Inventors: Nestor U. Soriano, Jr., Missouri City, TX (US); Kim B. Peyton, Richmond, TX (US); Kim R. Smith, Woodbury, MN (US); Joseph L. Stark, Katy, TX (US); Dennis R. Compton, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 477 days.

(21) Appl. No.: 14/525,158

(22) Filed: Oct. 27, 2014

(65) Prior Publication Data

US 2016/0115369 A1    Apr. 28, 2016

(51) Int. Cl.
C09K 8/524    (2006.01)
E21B 21/06    (2006.01)

(52) U.S. Cl.
CPC ............ C09K 8/524 (2013.01); *E21B 21/068* (2013.01)

(58) Field of Classification Search
None
See application file for complete search history.

(56) References Cited

U.S. PATENT DOCUMENTS

| | | | |
|---|---|---|---|
| 4,652,611 A | 3/1987 | Kuroda et al. | |
| 5,851,429 A | 12/1998 | Magyar | |
| 6,100,221 A | 8/2000 | Poelker et al. | |
| 6,174,843 B1 | 1/2001 | Peyton et al. | |
| 2002/0066391 A1 | 6/2002 | Goldman | |
| 2007/0130821 A1* | 6/2007 | Taubert | C10L 1/143 44/393 |
| 2010/0130385 A1* | 5/2010 | Guzmann | C09K 8/524 507/90 |
| 2011/0067295 A1 | 3/2011 | Castro Sotelo et al. | |
| 2011/0272325 A1 | 11/2011 | Soane et al. | |
| 2014/0048273 A1 | 2/2014 | Southwick et al. | |
| 2014/0250771 A1 | 9/2014 | Biggerstaff et al. | |

OTHER PUBLICATIONS

International Search Report and Written Opinion dated Feb. 10, 2016 in related International Application No. PCT/US2015/057457, 13 pages.
Al-Sabach, A. M., et al, "Styrene-Maleic Anhydride Copolymer Esters as Flow Improvers of Waxy Crude Oil", Journal of Dispersion Science and Technology, 2009, 30.3: 420-426; Feb. 23, 2009 (Feb. 23, 2009), 7 pages.
Xu, Jingjing, et al., "Synthesis of poly (maleic acid alkylamide-co-α-olefin-co-styrene) and their effect on flow ability of oils", Frontiers of Chemical Science and Engineering, 2011, 5.1: 74-78. Mar. 31, 2011 (Mar. 31, 2011). 5 pages.
Biggerstaff, P., et al., "Managing ROB for Marine and Rail Transport," Baker Hughes Incorporated, Presented at Crude Oil Quality Conference, Mar. 7, 2013, 31 pages.
Olsen, T., "Working with Tight Oil," Chemical Engineering Progress, Apr. 2015, pp. 35-39, American Institute of Chemical Engineers.
Extended European Search Report issued for EP15855814.8 dated Feb. 27, 2018, 11 pages.

* cited by examiner

*Primary Examiner* — Jeffrey D Washville
(74) *Attorney, Agent, or Firm* — Senniger Powers LLP (57) ABSTRACT

A composition of co-polymers, surfactants and solvents is provided for use in methods of reducing paraffin and wax deposition from crude oils in storage and transportation vessels.

20 Claims, 5 Drawing Sheets

COMPOSITION AND METHOD FOR DISPERSING PARAFFINS IN CRUDE OILS

FIELD OF THE INVENTION

The present invention generally relates to compositions and methods to reduce paraffin or wax depositions when storing and transporting crude oils. More specifically, the compounds are copolymers derived from specific maleic anhydride, alpha olefin, and styrene monomers that disperse paraffin or wax depositions of crude oils in storage and transportation vessels.

BACKGROUND OF THE INVENTION

Currently, the lack of existing pipeline infrastructure has resulted in increased transportation of some crude oils, such as Eagle Ford and Bakken crudes and other tight oils or shale oils, by rail. Such crude oils have a tendency to leave residue and build up solids (known as "remains on board") on the walls of storage and transportation vessels such as rail cars. Excessive residues reduce the efficiency of transporting crude oil and lead to increased costs related to added downtime for cleaning of the vessel as well as disposal of residues removed from the vessel which increase environmental burden. While the vessels can be cleaned to remove remains on board, this process generates hazardous waste, takes the vessel out of service during the cleaning period, and is expensive.

The addition of compounds to the crude oil which are effective in dispersing the solids and reducing the formation of residues in the vessels would be beneficial to the oil and gas industry. Such compounds would reduce the formation of solids during storage and transportation therefore mitigating economic loss and decreasing environmental impact.

SUMMARY OF THE INVENTION

A composition is provided for reducing paraffin or wax deposition in a crude oil storage or transportation vessel. The composition comprises a copolymer which is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene; an anionic surfactant; and a solvent. The alpha olefin monomer has the formula (I):

(I)

wherein $R_1$ is hydrogen or $C_{12}$-$C_{30}$ alkyl and $R_2$ is $C_{12}$-$C_{30}$ alkyl. The alkyl maleic anhydride monomer has the formula (II):

(II)

wherein $R_3$ is $C_{12}$-$C_{30}$ alkyl and $R_4$ is hydrogen or $C_{12}$-$C_{30}$ alkyl.

A method for reducing paraffin or wax deposition in a crude oil storage or transportation vessel is also provided. The method comprises adding the composition described above to a crude oil in an amount effective to reduce paraffin or wax deposition in the storage or transportation vessel containing the crude oil. The crude oil has an API gravity of at least 33.

Another method for reducing paraffin or wax deposition in a crude oil storage or transportation vessel is provided. The method comprises adding a copolymer as described above to a crude oil in an amount effective to reduce paraffin or wax deposition in the storage or transportation vessel containing the crude oil, wherein the crude oil has an API gravity of at least 33.

A method for reducing paraffin or wax deposition in a storage or transportation vessel used to contain a crude oil is also provided. The method comprises contacting the paraffin or wax deposit in the vessel with the composition as described above, the amount of the composition being effective to reduce paraffin or wax deposition in the vessel; and loading crude oil into the vessel such that the paraffin or wax is dispersed within the crude oil.

Yet another method for reducing paraffin or wax deposition in a storage or transportation vessel used to contain a crude oil is provided. The method comprises contacting the paraffin or wax deposit in the vessel with a copolymer as described above, the amount of the composition being effective to reduce paraffin or wax deposition in the vessel; and loading crude oil into the vessel such that the paraffin or wax is dispersed within the crude oil.

Other objects and features will be in part apparent and in part pointed out hereinafter.

DESCRIPTION OF THE PREFERRED EMBODIMENTS

It has been discovered that certain copolymers are effective in reducing paraffin or wax depositions in crude oil storage and transportation vessels. Without being held to any particular theory, it is believed that these copolymers disperse paraffin or wax, dissolve paraffin or wax, and provide paraffin or wax slippage on metal surfaces in contact with certain crude oils such as tight oils or shale oils, which minimize paraffin or wax deposition on such surfaces by up to 50% or more at 6° C. These copolymers also act with anionic surfactants such as alkylbenzene sulfonates to inhibit adhesion of paraffin or wax deposits onto metal surfaces.

A method for reducing paraffin or wax deposition in a crude oil storage or transportation vessel is provided. The method comprises adding a copolymer to a crude oil in an amount effective to reduce paraffin or wax deposition in the storage or transportation vessel containing the crude oil, wherein the crude oil has an API gravity of at least 33. For example, the crude oil can comprise paraffinic crude oil having an API gravity above 40. Alternatively, the crude oil can comprise an intermediate crude oil having an API gravity ranging from 33 to 40.

The copolymer is especially useful when added to a crude oil comprised of shale oil. The shale oil can comprise a tight oil such as Eagle Ford crude oil or a Bakken crude oil.

Preferably, the crude oil consists essentially of crude oil of the specified API gravity such that it does not include any significant amount of a refined petroleum product, such as a distillate (e.g., a cold flow distillate, or a diesel fuel). Most preferably, the crude oil does not comprise any distillate.

The copolymer is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene; an anionic surfactant; and a solvent. The alpha olefin monomer has the formula (I):

wherein $R_1$ is hydrogen or $C_{12}$-$C_{30}$ alkyl and $R_2$ is $C_{12}$-$C_{30}$ alkyl. The alkyl maleic anhydride monomer has the formula (II):

wherein $R_3$ is $C_{12}$-$C_{30}$ alkyl and $R_4$ is hydrogen or $C_{12}$-$C_{30}$ alkyl.

The copolymer can be a product of a polymerization reaction comprising maleic anhydride and the alpha olefin monomer wherein $R_1$ is hydrogen and $R_2$ is $C_{12}$-$C_{30}$ alkyl. Preferably, $R_2$ is $C_{24}$-$C_{30}$ alkyl. Such AOMA copolymers are commercially available as Surfomer™ from various manufacturers including Hangzhou Sage Chemical Co., Ltd. of Hangzhou, China. Such polymers can be prepared by radical polymerization using an initiator as described in Example 1.

The alpha olefin monomer used in the polymerization methods described herein can be a monomer wherein $R_2$ is primarily $C_{30}$ or above, such as AlphaPlus® C30+ alpha olefin from Chevron Phillips Chemical Company LP (The Woodlands, Tex.; 11.42 wt. % $C_{24}$ to $C_{28}$, 88.59 wt. % $C_{30}$ and above).

The copolymers that are a product of a polymerization reaction comprising an alpha olefin monomer can be esterified with a linear $C_{12}$-$C_{30}$ alcohol. Preferably, an esterified copolymer is esterified with a linear $C_{20}$-$C_{28}$ alcohol. Such esterified AOMA copolymers are commercially available as EC5351A from Nalco Champion (Houston, Tex.). Such polymers can be prepared as described in Example 1.

The copolymer can be a product of a polymerization reaction comprising the alkyl maleic anhydride monomer and the alpha olefin monomer wherein $R_1$ and $R_3$ are hydrogen and $R_2$ and $R_4$ are $C_{12}$-$C_{30}$ alkyl. Preferably, $R_2$ is $C_{24}$-$C_{30}$ alkyl and $R_4$ is $C_{20}$-$C_{28}$ alkyl. Such alpha olefin-alkyl maleic anhydride copolymers can be made by a process as described in Example 1 wherein an alkyl maleic anhydride monomer is used as a starting material rather than maleic anhydride. Such esterified AOMA copolymers are commercially available as EC5351A from Nalco Champion (Houston, Tex.).

The copolymer can be a product of a polymerization reaction comprising styrene and the alkyl maleic anhydride monomer wherein $R_3$ is hydrogen and $R_4$ is $C_{12}$-$C_{30}$ alkyl. Preferably, $R_4$ is $C_{20}$-$C_{28}$ alkyl. Such copolymers are commercially available as EC5661A from Nalco Champion (Houston, Tex.). Such styrene-alkyl maleic anhydride copolymers can be made by radical polymerization using an initiator such as an organic peroxide.

The copolymer can be a product of a polymerization reaction comprising styrene and the maleic anhydride monomer. For example, such a copolymer can be a styrene maleic anhydride copolymer (i.e., poly(styrene-co-maleic anhydride). Such copolymers are commercially available as Xiran™ polymers from Polyscope Polymers (Netherlands) and SMA resins from Sartomer (Exton, Pa.).

The copolymer can be mixed with a solvent before it is added to the crude oil. Preferred solvents comprise alcohols (e.g., straight chain or branched aliphatic such as methanol, ethanol, propanol, isopropanol, butanol, 2-ethylhexanol, hexanol, octanol, decanol, 2-ethylhexanol, 2-butoxyethanol, etc.), aromatics (e.g., toluene, xylene, heavy aromatic naphtha such as Aromatic 150, light aromatic naphtha), hydrocarbons (e.g., pentane, hexane, cyclohexane, methylcyclohexane, heptane, decane, dodecane, diesel), ketones (e.g., cyclohexanone, diisobutylketone), ethers (e.g., tetrahydrofuran (THF)), amides (e.g., N-methylpyrrolidinone (NMP), N,N-dimethylformamide), nitriles, sulfoxides (e.g., dimethyl sulfoxide (DMSO)), esters, glycols (e.g., ethylene glycol, 1,2-propylene glycol, 1,3-propylene glycol), glycol ethers (e.g., ethylene glycol monobutyl ether (EGMBE) and diethylene glycol monoethyl ether), or a combination thereof. Heavy aromatic naphtha is most preferred.

The copolymer can also be mixed with an anionic surfactant. Alternatively, an anionic surfactant can be added to the crude oil. Preferably, the anionic surfactant comprises a linear $C_6$-$C_{30}$ alkyl benzene sulfonate, a linear $C_6$-$C_{30}$ alcohol sulfate, an alkoxylated linear $C_6$-$C_{30}$ alcohol sulfate, an alkyl sulfate, an alkyl ether sulfate, an olefin sulfonate, or a combination thereof. A preferred anionic surfactant comprises a linear $C_6$-$C_{30}$ alkyl benzene sulfonic acid or a salt thereof. Suitable salts include sodium or ammonium salt forms.

More particularly, up to about 70.0 wt. % solvent, up to about 15.0 wt. % anionic surfactant, and about 22.5 to 100 wt. % copolymer are added to the crude oil, based on the total weight of solvent, anionic surfactant and copolymer added to the crude oil.

When all three components are added to the crude oil, from about 40.0 to about 70.0 wt. % solvent, about 0.1 to about 15.0 wt. % anionic surfactant, and about 22.5 to 60.0 wt. % copolymer are added to the crude oil, based on the total weight of solvent, anionic surfactant and copolymer added to the crude oil.

When solvent and copolymer are added to the crude oil, from about 40.0 to about 70.0 wt. % solvent, and about 30.0 to 60.0 wt. % copolymer are added to the crude oil, based on the total weight of solvent, anionic surfactant and copolymer added to the crude oil.

An effective amount of the copolymer ranges from about 50 to about 1,000 ppm in the crude oil.

The storage or transportation vessel can be any vessel used to store or transport a crude oil, including but not limited to a storage tank, rail car, tank truck, marine vessel, barge, or pipeline. Preferably the composition can be added to a crude oil contained in a storage tank, rail car, or tank truck.

Another method is provided for reducing paraffin or wax deposition in a crude oil storage or transportation vessel. The method comprises adding a composition containing the copolymer as described herein to a crude oil in an amount effective to reduce paraffin or wax deposition in the storage or transportation vessel containing the crude oil. The crude oil has an API gravity of at least 33. For example, the crude oil can comprise of paraffinic crude oil having an API gravity above 40. Alternatively, the crude oil can comprise an intermediate crude oil having an API gravity ranging from 33 to 40.

A method for reducing paraffin or wax deposition in a storage or transportation vessel used to contain a crude oil is also provided. The method comprises contacting the paraffin or wax deposit in the vessel with a copolymer as described above or a composition as described below, the amount of the copolymer or the composition being effective to reduce paraffin or wax deposition in the vessel; and loading crude oil into the vessel such that the paraffin or wax is dispersed within the crude oil.

A composition is provided for reducing paraffin or wax deposition in a crude oil storage or transportation vessel. The composition comprises: a copolymer which is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene; an anionic surfactant; and a solvent. Such copolymers are described above and in the examples.

The composition further comprises a solvent and an anionic surfactant, both as described above and in the examples.

The composition can comprise about 40.0 to about 70.0 wt. % solvent, about 0.1 to about 15.0 wt. % anionic surfactant, and about 22.5 to about 60.0 wt. % copolymer.

The composition can further comprise one or more additional components including but not limited to a corrosion inhibitor, a solvent, an asphaltene inhibitor, an additional paraffin inhibitor, a scale inhibitor, an emulsifier, a dispersant, an emulsion breaker, a gas hydrate inhibitor, a biocide, a pH modifier, and a surfactant. A composition of the invention can comprise from 0 to 10 percent by weight of one or more of these additional components, based on total weight of the composition.

Suitable corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For example, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltrimethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof. The quaternary ammonium salt can be an alkylamine benzyl quaternary ammonium salt, a benzyl triethanolamine quaternary ammonium salt, a benzyl alkyl($C_{12}$-$C_{18}$)dimethylammonium salt, or a benzyl dimethylaminoethanolamine quaternary ammonium salt.

The corrosion inhibitor can be a quaternary ammonium or alkyl pyridinium quaternary salt such as those represented by the general formula:

wherein $R^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. The corrosion inhibitor can include benzyl pyridinium chloride.

The corrosion inhibitor can be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

wherein $R^{12a}$ and $R^{13a}$ are independently a $C_1$-$C_6$ alkyl group or hydrogen, $R^{11a}$ is hydrogen, $C_1$-$C_6$ alkyl, $C_1$-$C_6$ hydroxyalkyl, or $C_1$-$C_6$ arylalkyl, and $R^{10a}$ is a $C_1$-$C_{20}$ alkyl or a $C_1$-$C_{20}$ alkoxyalkyl group. For example, $R^{11a}$, $R^{12a}$ and $R^{13a}$ are each hydrogen and $R^{10a}$ is the alkyl mixture typical in tall oil fatty acid (TOFA).

The corrosion inhibitor compound can be an imidazolinium compound of the following formula:

wherein $R^{12a}$ and $R^{13a}$ are independently a $C_1$-$C_6$ alkyl group or hydrogen, $R^{11a}$ and $R^{14a}$ are independently hydrogen, $C_1$-$C_6$ alkyl, $C_1$-$C_6$ hydroxyalkyl, or $C_1$-$C_6$ arylalkyl, and $R^{10}$ is a $C_1$-$C_{20}$ alkyl or a $C_1$-$C_{20}$ alkoxyalkyl group.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound can further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Additional paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylpnenolic resins.

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 nitrogen atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each nitrogen atom, at least 2 of the numbers of methylene groups in each phosphonate being different. Other suitable dispersion agents include lignin or derivatives of lignin such as lignosulfonate and naphthalene sulfonic acid and derivatives.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Suitable hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), and glyoxal.

Suitable gas hydrate inhibitors include, but are not limited to, thermodynamic hydrate inhibitors (THI), kinetic hydrate inhibitors (KHI), and anti-agglomerates (AA).

Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Suitable biocides include, but are not limited to, oxidizing and non-oxidizing biocides.

Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DB-NPA)), sulfur compounds (e.g., isothiazolone, carbamates, and metronidazole), and quaternary phosphonium salts (e.g., tetrakis(hydroxymethyl)phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, Ca(OH)$_2$, CaO, Na$_2$CO$_3$, KHCO$_3$, K$_2$CO$_3$, NaHCO$_3$, MgO, and Mg(OH)$_2$.

Suitable surfactants include, but are not limited to, anionic surfactants, cationic surfactants, zwitterionic surfactants, and nonionic surfactants.

Additional anionic surfactants include alkyl carboxylates and alkyl ether carboxylates, alkyl and ethoxylated alkyl phosphate esters, and mono and dialkyl sulfosuccinates and sulfosuccinamates.

Cationic surfactants include alkyl trimethyl quaternary ammonium salts, alkyl dimethyl benzyl quaternary ammonium salts, dialkyl dimethyl quaternary ammonium salts, and imidazolinium salts.

Nonionic surfactants include alcohol alkoxylates, alkylphenol alkoxylates, block copolymers of ethylene, propylene and butylene oxides, alkyl dimethyl amine oxides, alkyl-bis(2-hydroxyethyl)amine oxides, alkyl amidopropyl dimethyl amine oxides, alkylamidopropyl-bis(2-hydroxyethyl)amine oxides, alkyl polyglucosides, polyalkoxylated glycerides, sorbitan esters and polyalkoxylated sorbitan esters, alkoyl polyethylene glycol esters and diesters, betaines, and sultanes. Amphoteric surfactants such as alkyl amphoacetates and amphodiacetates, alkyl amphopropionates and amphodipropionates, and alkyliminodipropionate can also be used.

The surfactant can be a quaternary ammonium compound, an amine oxide, an ionic or non-ionic surfactant, or any combination thereof.

Suitable quaternary amine compounds include, but are not limited to, alkyl benzyl ammonium chloride, benzyl cocoalkyl($C_{12}$-$C_{18}$)dimethylammonium chloride, dicocoalkyl($C_{12}$-$C_{18}$)dimethylammonium chloride, ditallow dimethylammonium chloride, di(hydrogenated tallow alkyl) dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl(2-ethylhyexyl)dimethyl quaternary ammonium methyl sulfate.

The compositions can further include additional functional agents or additives that provide a beneficial property, such as pH adjusters or other neutralizing agents, emulsifiers, sequestrants, solubilizers, other lubricants, buffers, detergents, cleaning agents, rinse aids, preservatives, binders, thickeners or other viscosity modifiers, processing aids, foam inhibitors or foam generators, threshold agent or system, aesthetic enhancing agent (i.e., dye, odorant, perfume, and mixtures thereof. Additional agents or additives will vary according to the particular composition being manufactured and its intend use as one skilled in the art will appreciate.

Alternatively, the compositions can not contain any of the additional agents or additives.

The composition is especially useful when added to a crude oil comprised of shale oil. The shale oil can comprise a tight oil such as Eagle Ford crude oil or a Bakken crude oil.

An effective amount of the composition ranges from about 50 to about 1,000 ppm in the crude oil.

Having described the invention in detail, it will be apparent that modifications and variations are possible without departing from the scope of the invention defined in the appended claims.

EXAMPLES

The following non-limiting examples are provided to further illustrate the present invention.

Example 1

Polymer Synthesis

Non-Esterified Alpha-olefin-maleic anhydride co-polymer (non-esterified AOMA). 80 g of maleic anhydride (0.82 moles) and about 303 g of alpha-olefin (0.65 to 0.82 moles depending on average MW of the $C_{12}$ to $C_{30}$ alpha-olefin) were heated to 65 to 80° C. in a four necked round bottom flask to completely melt the reactants while stirring under nitrogen sweep. Once all materials are melted, nitrogen sweep was continued for an additional 15 minutes while maintaining the temperature at 65 to 80° C. The mixture was then heated further to 140° C. with continuous supply of nitrogen. Tertiary-butylperbenzoate in 1:1 (by weight) hydrocarbon solvent (Exxsol D80) was used as the initiator. The initiator solution was prepared by mixing 1.64 g of tert-butylperbenzoate (0.0084 moles) with equal amounts by weight of the solvent. The initiator solution was introduced in the reaction mixture in five equal shots (about 720 µl per shot) to control the temperature as the initiation reaction is exothermic. The first shot was introduced once the mixture reaches the desired temperature of 140° C. The succeeding shots were introduced every 30 minutes to give a total reaction time of 2.5 hours. During the course of the polymerization, the reaction temperature was not allowed to exceed 165° C. The reaction gave a light brown to brown viscous polymer (non-esterified AOMA). The formulated non-esterified AOMA was prepared by diluting the polymer with 40-60% heavy aromatic naphtha while hot.

Esterified Alpha-olefin-maleic anhydride co-polymer (esterified AOMA). The non-esterified AOMA described above was esterified with fatty alcohol at 125° C. in the absence of any catalyst. After the AOMA preparation, $C_{12}$ to $C_{30}$ linear fatty alcohol at 0.41 moles (i.e., half the moles of maleic anhydride used in forming the AOMA; e.g. 152 g for $C_{20}$-$C_{28}$ alcohols with about 375 g/mol average MW) were added to the reaction mixture while maintaining the temperature at 125° C. At this time, nitrogen sweep was no longer necessary. The reaction was allowed to proceed for an additional 2.5 to 3 hours to give a light brown to brown viscous liquid. The formulated esterified AOMA was prepared by diluting the polymer with 40-60% heavy aromatic naphtha.

Example 2

Methyl Ethyl Ketone Test (MEK Test)

A simple test was developed for fast screening of candidate copolymers in dispersing wax in crude oils (e.g., tight oils such as Eagle Ford crudes). The test involved treating a warm crude sample with the copolymer additive followed by agitation. The sample is then diluted with methyl ethyl ketone (MEK) and let stand at room temperature. Wax is insoluble in MEK and a blank crude sample (without copolymer additive) gives a wax precipitate instantly. Certain copolymers have the tendency to disperse these precipitates. Copolymer additives that do not show activity give a precipitate similar to the blank crude sample. More specifically, the test was conducted as follows.

Crude oil samples were warmed at 52° C. in an oven (or a temperature above the wax appearance temperature (WAT) for the crude sample). 200 µl of 1% solution of copolymer additive was pipetted into each graduated centrifuge tube. 500 µl of warm crude sample was added into each centrifuge tube containing the additive, and the mixture was agitated using a vortex. About 5 ml of MEK was added into each tube, and the tubes were capped with stoppers and agitated for 30 seconds using a vortex. The tubes were then diluted to mark with MEK, capped with a stopper and shaken ten times. After a period left standing, the dispercancy of each sample is observed.

Figure 1:
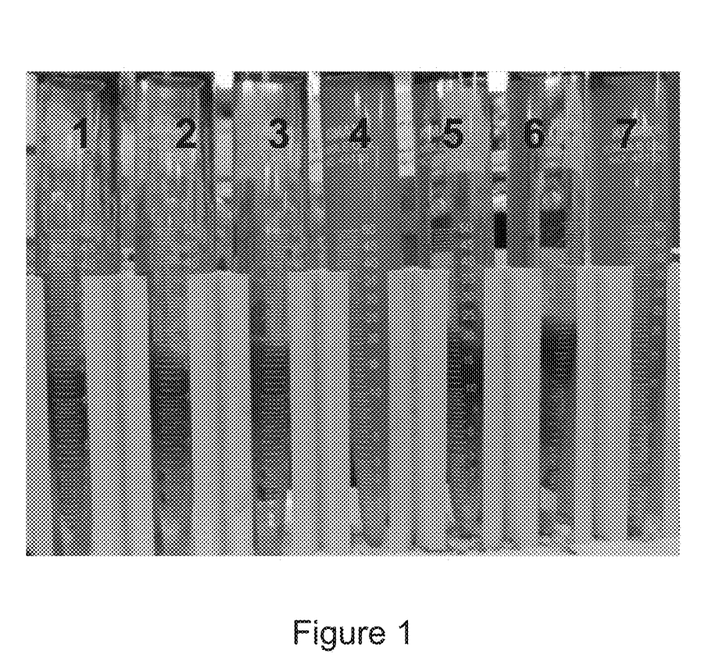
FIGS. 1 through 4 show the appearance of samples of various Eagle Ford crude oils treated with copolymer additives.

FIGS. 1-4 depict the dispercancy of four different Eagle Ford crude oils tested with various copolymer additives. FIG. 1 shows the appearance of each sample of a first Eagle Ford crude oil, wherein, from left to right, #1 is a blank control containing no copolymer additive, #2 is 1,2-dodecandediol, #3 is dodecane-(1,12)-diyl dioleate, #4 is a non-esterified $C_{30}$ AOMA, #5 is an ethoxylated tallowamine, #6 is an ethoxylated oleylamine, and #7 is an esterified ($C_{20}$-$C_{28}$) $C_{30}$ AOMA.

Figure 2:
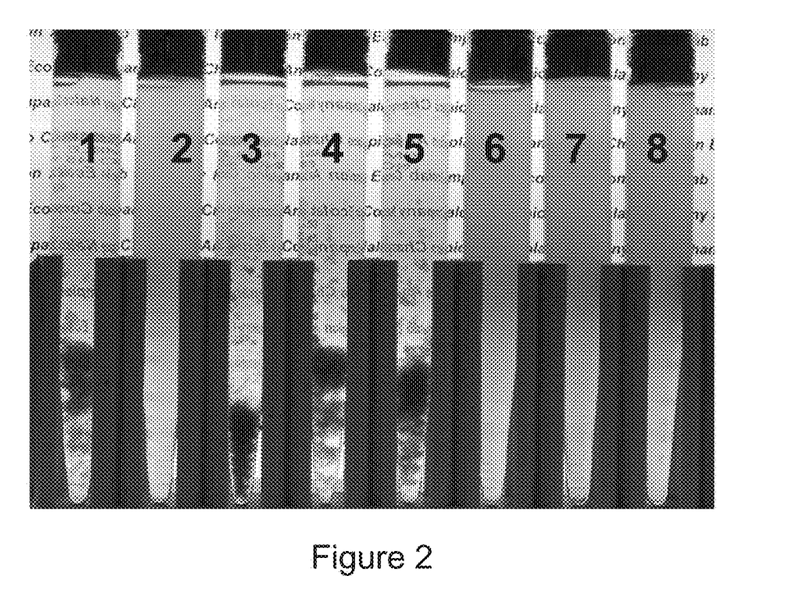

FIG. 2 shows the appearance of each sample of a second Eagle Ford crude oil, wherein, from left to right, #1 is a blank control containing no copolymer additive, #2 is an esterified ($C_{20}$-$C_{28}$) styrene AOMA, #3 is a non-esterified $C_{10}$ AOMA, #4 is a non-esterified $C_{12}$ AOMA, #5 is a non-esterified $C_{14}$ AOMA, #6 is a non-esterified ($C_{24}$-$C_{28}$) AOMA, and #7 is a non-esterified $C_{30}$ AOMA, and #8 is an esterified ($C_{20}$-$C_{28}$) $C_{30}$ AOMA.

Figure 3:
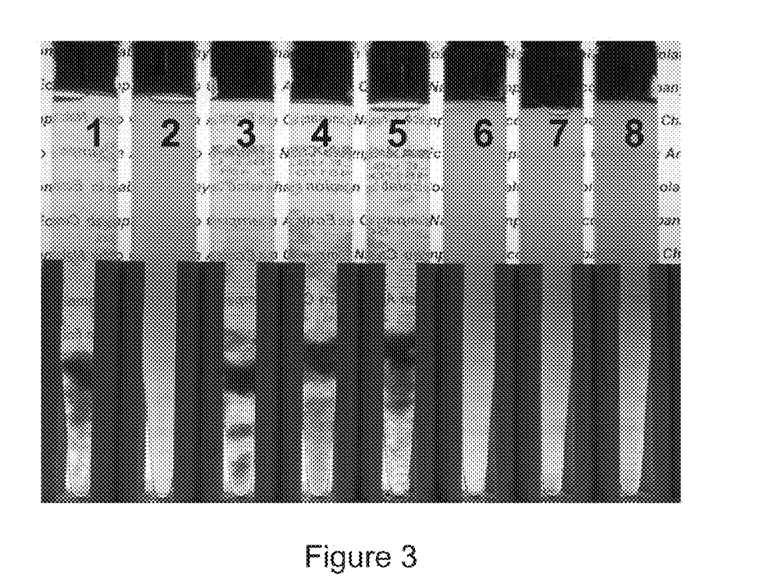

FIG. 3 shows the appearance of each sample of a third Eagle Ford crude oil, wherein, from left to right, #1 is a blank control containing no copolymer additive, #2 is an esterified ($C_{20}$-$C_{28}$) styrene AOMA, #3 is a non-esterified $C_{10}$ AOMA, #4 is a non-esterified $C_{12}$ AOMA, #5 is a non-esterified $C_{14}$ AOMA, #6 is a non-esterified ($C_{24}$-$C_{28}$) AOMA, and #7 is a non-esterified $C_{30}$ AOMA, and #8 is an esterified ($C_{20}$-$C_{28}$) $C_{30}$ AOMA.

Figure 4:
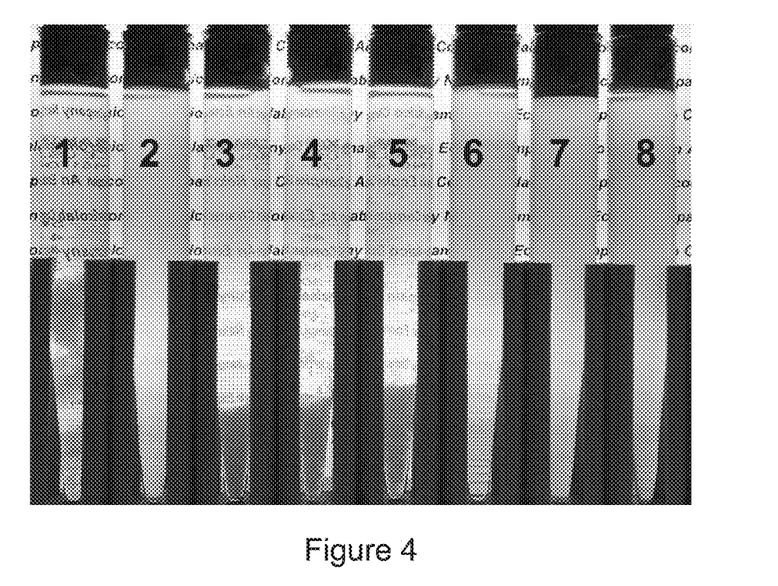

FIG. 4 shows the appearance of each sample of a third Eagle Ford crude oil, wherein, from left to right, #1 is a blank control containing no copolymer additive, #2 is an esterified ($C_{20}$-$C_{28}$) styrene AOMA, #3 is a non-esterified $C_{10}$ AOMA, #4 is a non-esterified $C_{12}$ AOMA, #5 is a non-esterified $C_{14}$ AOMA, #6 is a non-esterified ($C_{24}$-$C_{28}$) AOMA, and #7 is a non-esterified $C_{30}$ AOMA, and #8 is an esterified ($C_{20}$-$C_{28}$) $C_{30}$ AOMA.

For all four Eagle Ford crude oils, the esterified ($C_{20}$-$C_{28}$) styrene AOMA, non-esterified ($C_{24}$-$C_{28}$) AOMA, non-esterified $C_{30}$ AOMA, and esterified ($C_{20}$-$C_{28}$) $C_{30}$ AOMA exhibited increased dispersancy as compared to the control. Co-polymers derived from long chain ($C_{24}$-$C_{30}$) alpha olefins and maleic anhydride, whether non-esterified or esterified with fatty alcohols ($C_{20}$-$C_{28}$) exhibited tendency to disperse waxes in tight oils. The non-esterified co-polymer resulted in a more stable dispersion than the esterified counterpart. And while the co-polymer derived from shorter alpha-olefins ($C_{10}$-$C_{14}$) did not show tendency to disperse wax in these particular crude oils (Eagle Ford crudes), we believe that it will show dispersancy in other types of paraffinic crudes containing shorter chain waxes.

Example 3

Cold Finger Test

The efficacy of the additive in preventing wax deposition was also evaluated by Cold Finger Test. The test was conducted using 100 ml of Eagle Ford crude oil maintained at 40° C. in a water bath while stirring at 180 rpm. The cold finger submerged in the sample was at 6° C. After 23 hours, the deposit was collected and wax inhibition was calculated using the formula below:

$$\% \text{ wax inhibition} = \left( \frac{(\text{wt wax deposit in blank} - \text{wt wax deposit with additive})}{\text{wt wax deposit in blank}} \right) \times 100$$

Figure 5:
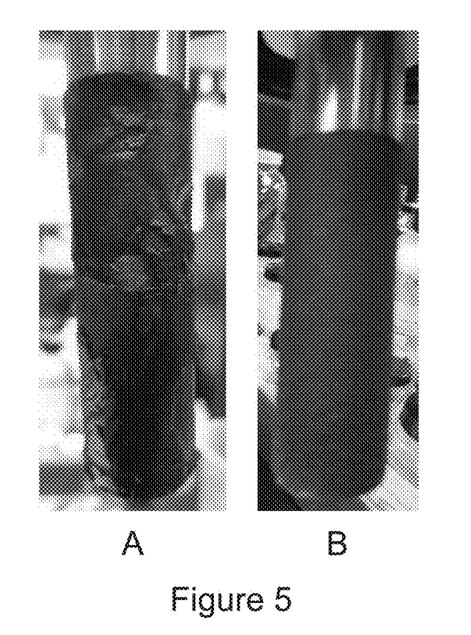
FIGS. 5 and 6 depict cold fingers using blank crude oil (Panel A), and cold fingers using crude oil treated with copolymer additives.
Figure 6:
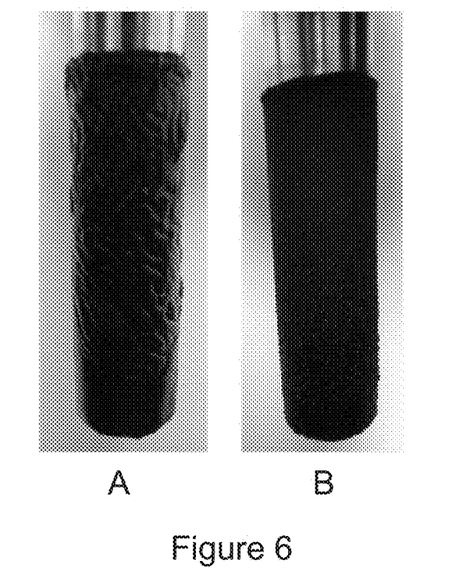

FIG. 5, panel A depicts the cold finger using blank crude oil, and panel B is the cold finger using crude oil treated with a non-esterified $C_{30}$ AOMA. Likewise, FIG. 6, panel A depicts the cold finger using a different blank Eagle Ford crude oil and panel B is the cold finger using crude oil treated with esterified ($C_{20}$-$C_{28}$) styrene AOMA. The use of non-esterified and esterified $C_{30}$ AOMA resulted in a 30 to 58% reduction in wax deposition under the conditions stated above at 400 to 600 ppm treatment rates. Additional wax inhibition results are reported in Table 1:

TABLE 1

Wax inhibition in Eagle Ford crude with the use of additive by cold finger test.

| Active | % Active | Treat Rate (ppm) | % Wax Inhibition |
|---|---|---|---|
| Non-esterified $C_{30}$ AOMA | 40-60 | 400-600 | 43-53 |
| Esterified ($C_{20}$-$C_{28}$) $C_{30}$ AOMA | 40-60 | 400-600 | 31-58 |

TABLE 1-continued

Wax inhibition in Eagle Ford crude with the use of additive by cold finger test.

| Active | % Active | Treat Rate (ppm) | % Wax Inhibition |
|---|---|---|---|
| Non-esterified $C_{14}$ AOMA | 40-60 | 400-600 | 0-13 |
| Non-esterified $C_{12}$ AOMA | 40-60 | 400-600 | 0 |
| Esterified ($C_{20}$-$C_{28}$) Styrene AOMA | 40-60 | 400-600 | 6-9 |

Example 4

Pour Point Test

Treatment of Eagle Ford crude oils with esterified and non-esterified AOMA also resulted in lower pour point. The pour point of three different Eagle Ford crudes (samples A-C) was improved by 9 to 12° C. upon treatment with the copolymer additive as shown in Table 2.

TABLE 2

Impact of esterified and non-esterified AOMA on the pour point of Eagle Ford crude samples.

| | | Pour Point (° C.) | | |
|---|---|---|---|---|
| Eagle Ford Crude | Blank | Esterified ($C_{20}$-$C_{28}$) $C_{30}$ AOMA | Non-esterified $C_{30}$ AOMA | WAT[1] (° C.) |
| A | 6 | −6 | −3 | 36 |
| B | 3 | −6 | −6 | 36 |
| C | 0 | −9 | −12 | |

[1]Wax Appearance Temperature (WAT) as measured by DSC.

Example 5

Temperature—Viscosity Profile

Figure 7:
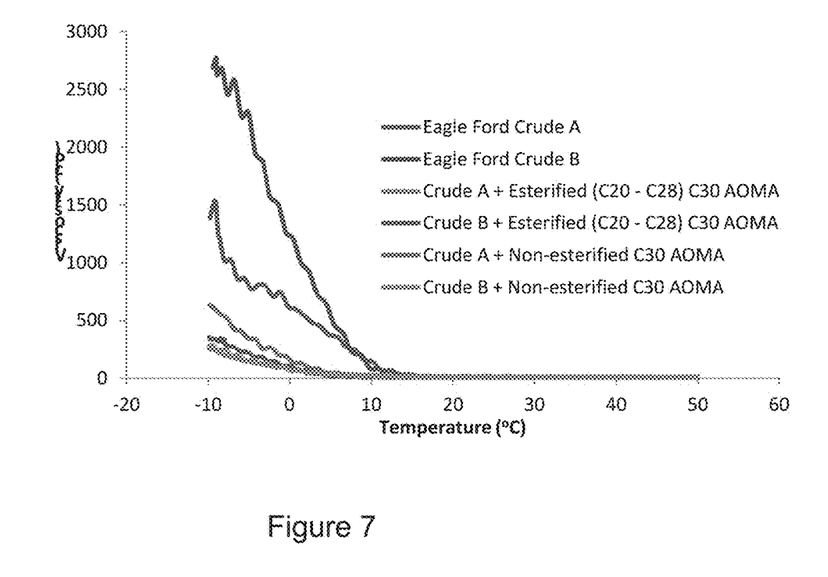
FIG. 7 shows the temperature-viscosity profile of Eagle Ford crude samples treated with copolymer additives.

The temperature—viscosity profile of the untreated and treated Eagle Ford crude were recorded using a Brookfield viscometer. The impact of the non-esterified and esterified AOMA is shown in FIG. 7. The temperature-viscosity profile of Eagle Ford crude samples was improved significantly when treated with these copolymer additives, resulting in better pumpability at lower temperatures.

Example 6

Suspended Solids

Figure 8:
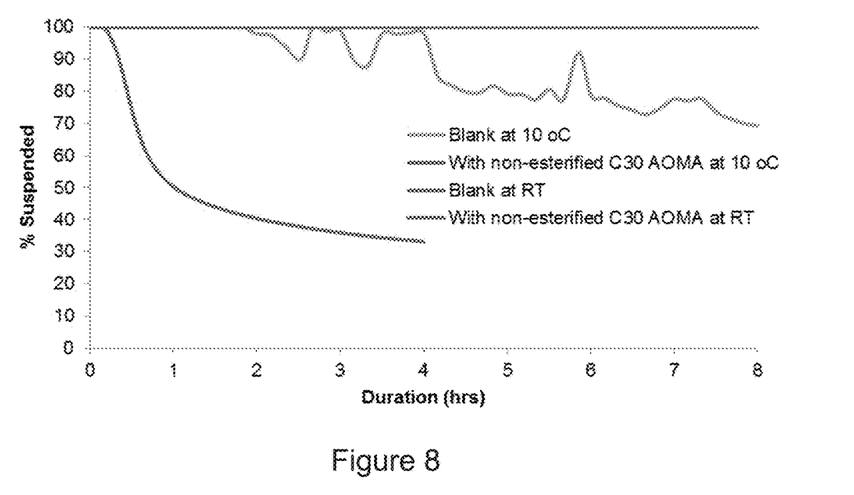
FIG. 8 depicts the impact of non-esterified $C_{30}$ AOMA on the stability of Eagle Ford crude at RT and 10° C.

The amount of suspended solids in untreated and treated Eagle Ford crude was measured by Turbiscan at room temperature (RT) and at 10° C. The untreated crude showed only up to 70% suspended solids after 8 hours at 10° C. and 40% suspended solids after 4 hours at room temperature. With the addition of esterified (data not shown) and non-esterified $C_{30}$ AOMA, solid settling was minimized to afford a 100% suspended solids throughout the duration of the test. The impact of non-esterified $C_{30}$ AOMA on the stability of Eagle Ford crude at RT and 10° C. is shown in FIG. 8.

Example 7

Composition Testing

Figure 9:
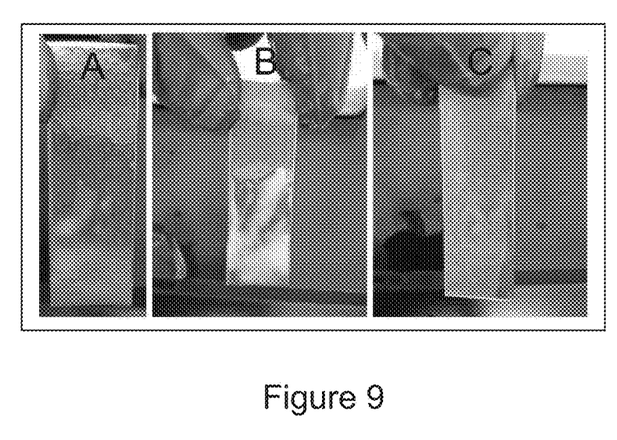
FIG. 9 depicts the results of the steel adhesion test of untreated (panel A) and treated (panels B & C) Bordovsky crude oil.

Steel Adhesion Test. A procedure was developed to demonstrate the efficacy of a copolymer additive to promote slippage of crude oil onto metal surfaces at low temperatures. The combination of non-esterified $C_{30}$ AOMA with sodium alkylbenzene sulfonate anionic surfactant (and its other forms e.g. ammonium salt or acid form) showed better slippage performance compared to untreated Bordovsky Eagle Ford crude. More specifically, the desired amount of copolymer additive was weighed and placed in a 20 mL vial. Five mL of crude oil was added to each vial and sealed tightly. The sealed vials were placed in a 140 F oven for 15 minutes. The vials were then removed from the oven and shaken very gently. The steel coupon was inserted into each sample, and the vials were placed in a freezer for 2 hours. The vials were removed from the freezer and slowly inverted. After thirty minutes passed to allow the vials to warm to room temperature, each vial was carefully opened upside-down over a receptacle. The steel coupon was removed and observed for the amount of deposit adhering on the metal surface. FIG. 9 depicts the results of the steel adhesion test of untreated and treated Bordovsky crude oil (A: untreated sample; B: treated with non-esterified $C_{30}$ AOMA; C: treated with $C_{30}$ AOMA+sodium alkylbenzene sulfonate).

Figure 10:
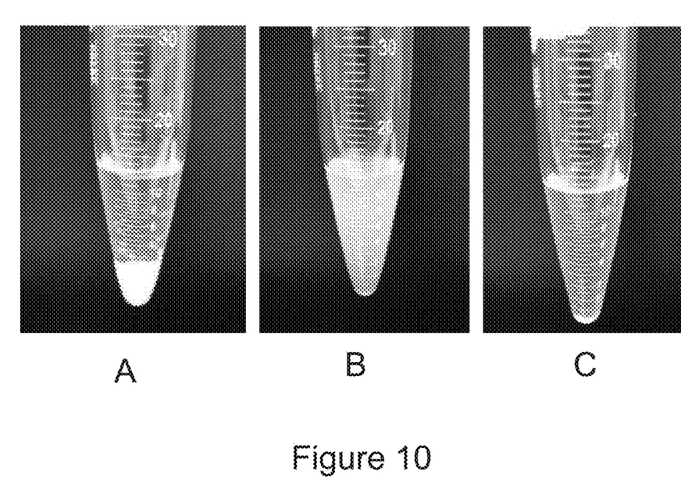
FIG. 10 depicts MEK test results on untreated (panel A) and treated (panels B & C) Bordovsky Eagle Ford crude.

MEK Test. A combination of non-esterified $C_{30}$ AOMA and sodium alkylbenzenesulfonate also enhanced the efficacy of the former in minimizing deposits in Bordovsky Eagle Ford crude oil. In Example 2, both non-esterified and esterified AOMA aid in dispersing wax in tight oils such as Eagle Ford. When combined with an anionic surfactant (alkylbenzenesulfonic acid or a salt thereof (e.g. sodium or ammonium)), the MEK test showed increased solubility of the wax. FIG. 10 depicts MEK test results on Bordovsky Eagle Ford crude. (A: untreated; B: treated with non-esterified $C_{30}$ AOMA; C: treated with non-esterified $C_{30}$ AOMA+sodium alkylbenzene sulfonate; copolymer to surfactant weight ratio of 4:1). When fully formulated, the combined actives (copolymer+surfactant) should be 40-60% of the final formulation, with the remainder being solvent such as heavy aromatic naphtha.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. The present disclosure also contemplates other embodiments "comprising," "consisting of" and "consisting essentially of," the embodiments or elements presented herein, whether explicitly set forth or not.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C═O)— groups, heterocylic groups, cycloalkyl groups, amino groups, alkyl—and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear or branched hydrocarbon radical having primarily the number of carbon atoms specified, and preferably having primarily 1 to 30 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, or 30 carbons) unless otherwise specified. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined above. For example, an alkyl group is $C_{30}$ alkyl if it contains a range of carbon atoms (e.g., $C_{24}$-$C_{66}$) but the majority by weight within the range is $C_{30}$. More specifically, an alkyl group consisting of 5 wt. % $C_{28}$, 25% $C_{30}$, 20 wt. % $C_{32}$, 15 wt. % $C_{34}$, 10 wt. % $C_{36}$ and each of $C_{40}$-$C_{66}$ at less than 5 wt. % is a $C_{30}$ alkyl as used herein since the majority is $C_{30}$.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A method for reducing paraffin or wax deposition in a crude oil storage or transportation vessel, the method comprising adding a composition to a crude oil in an amount effective to reduce paraffin or wax deposition in the storage or transportation vessel containing the crude oil, wherein the crude oil has an API gravity of at least 33 and the composition comprises a copolymer which is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene, the alpha olefin monomer having the formula (I):

(I)

wherein $R_1$ is hydrogen or $C_{12}$-$C_{30}$ alkyl and $R_2$ is $C_{12}$-$C_{30}$ alkyl, and the alkyl maleic anhydride monomer having the formula (II):

(II)

wherein $R_3$ is $C_{12}$-$C_{30}$ alkyl and $R_4$ is hydrogen or $C_{12}$-$C_{30}$ alkyl;

an anionic surfactant; and
a solvent; and
wherein if the copolymer is the product of the polymerization reaction comprising (i) the alpha olefin monomer and the maleic anhydride monomer, $R_1$ is hydrogen and $R_2$ is $C_{24}$-$C_{30}$ alkyl.

2. A method for reducing paraffin or wax deposition in a crude oil storage or transportation vessel, the method comprising adding a copolymer to a crude oil in an amount effective to reduce paraffin or wax deposition in the storage or transportation vessel containing the crude oil, wherein the crude oil has an API gravity of at least 33, and the copolymer is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene, the alpha olefin monomer having the formula (I):

(I)

wherein $R_1$ is hydrogen or $C_{12}$-$C_{30}$ alkyl and $R_2$ is $C_{12}$-$C_{30}$ alkyl, and the alkyl maleic anhydride monomer having the formula (II):

(II)

wherein $R_3$ is $C_{12}$-$C_{30}$ alkyl and $R_4$ is hydrogen or $C_{12}$-$C_{30}$ alkyl; and wherein if the copolymer is the product of the polymerization reaction comprising (i) the alpha olefin monomer and the maleic anhydride monomer, $R_1$ is hydrogen and $R_2$ is $C_{24}$-$C_{30}$ alkyl.

3. The method of claim 2, wherein the crude oil comprises a paraffinic crude oil having an API gravity above 40.

4. The method of claim 2, wherein the crude oil comprises an intermediate crude oil having an API gravity ranging from 33 to 40.

5. The method of claim 2, wherein the crude oil comprises a shale oil.

6. The method of claim 2, wherein the effective amount of the copolymer is from 50 to 1,000 ppm in the crude oil.

7. The method of claim 2, wherein the storage or transportation vessel comprises a storage tank, rail car, tank truck, marine vessel, barge, or pipeline.

8. The method of claim 2, wherein the copolymer is a product of a polymerization reaction comprising maleic anhydride and the alpha olefin monomer wherein $R_1$ is hydrogen and $R_2$ is $C_{24}$-$C_{30}$ alkyl.

9. The method of claim 2, wherein the copolymer is a product of a polymerization reaction comprising styrene and the maleic anhydride monomer.

10. The method of claim 2, wherein the copolymer is a product of a polymerization reaction comprising the alkyl maleic anhydride monomer and the alpha olefin monomer wherein $R_1$ and $R_3$ are hydrogen and $R_2$ and $R_4$ are $C_{12}$-$C_{30}$ alkyl.

11. The method of claim 2, wherein the copolymer is a product of a polymerization reaction comprising styrene and the alkyl maleic anhydride monomer wherein $R_3$ is hydrogen and $R_4$ is $C_{12}$-$C_{30}$ alkyl.

12. The method of claim 2, wherein the copolymer is mixed with a solvent comprising methanol, heavy aromatic naphtha, light aromatic naphtha, 2-ethylhexanol, or a combination thereof.

13. The method of claim 2, further comprising adding an anionic surfactant to the crude oil.

14. The method of claim 13, wherein the anionic surfactant comprises a linear $C_6$-$C_{30}$ alkyl benzene sulfonate, a linear $C_6$-$C_{30}$ alcohol sulfate, an alkoxylated linear $C_6$-$C_{30}$ alcohol sulfate, an alkyl sulfate, an alkyl ether sulfate, an olefin sulfonate, or a combination thereof.

15. The method of claim 2, wherein from about 0 to about 70.0 wt. % solvent, about 0 to about 15.0 wt. % anionic surfactant, and about 22.5 to 100 wt. % copolymer are added to the crude oil, based on the total weight of solvent, anionic surfactant and copolymer added to the crude oil.

16. The method of claim 15, wherein from about 40.0 to about 70.0 wt. % solvent, about 0.1 to about 15.0 wt. % anionic surfactant, and about 22.5 to 60.0 wt. % copolymer are added to the crude oil, based on the total weight of solvent, anionic surfactant and copolymer added to the crude oil.

17. The method of claim 2, wherein the crude oil consists essentially of crude oil.

18. The method of claim 2, wherein the crude oil does not comprise any cold flow distillate or diesel fuel.

19. A method for reducing paraffin or wax deposition in a storage or transportation vessel used to contain a crude oil, the method comprising:
   contacting the paraffin or wax deposit in the vessel with a composition, the amount of the composition being effective to reduce paraffin or wax deposition in the vessel; and
   loading crude oil into the vessel such that the paraffin or wax is dispersed within the crude oil, wherein the composition comprises
   a copolymer which is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene, the alpha olefin monomer having the formula (I):

wherein $R_1$ is hydrogen or $C_{12}$-$C_{30}$ alkyl and $R_2$ is $C_{12}$-$C_{30}$ alkyl, and the alkyl maleic anhydride monomer having the formula (II):

wherein $R_3$ is $C_{12}$-$C_{30}$ alkyl and $R_4$ is hydrogen or $C_{12}$-$C_{30}$ alkyl;
   an anionic surfactant; and
   a solvent; and
   wherein if the copolymer is the product of the polymerization reaction comprising (i) the alpha olefin monomer and the maleic anhydride monomer, $R_1$ is hydrogen and $R_2$ is $C_{24}$-$C_{30}$ alkyl.

20. A method for reducing paraffin or wax deposition in a storage or transportation vessel used to contain a crude oil, the method comprising:
   contacting the paraffin or wax deposit in the vessel with a copolymer, the amount of the copolymer being effective to reduce paraffin or wax deposition in the vessel; and
   loading crude oil into the vessel such that the paraffin or wax is dispersed within the crude oil,
   wherein the copolymer is a product of a polymerization reaction comprising (i) an alpha olefin monomer and a maleic anhydride monomer, (ii) the alpha olefin monomer and an alkyl maleic anhydride monomer, (iii) the maleic anhydride monomer and styrene; or (iv) the alkyl maleic anhydride monomer and styrene, the alpha olefin monomer having the formula (I):

wherein $R_1$ is hydrogen or $C_{12}$-$C_{30}$ alkyl and $R_2$ is $C_{12}$-$C_{30}$ alkyl, and the alkyl maleic anhydride monomer having the formula (II):

wherein $R_3$ is $C_{12}$-$C_{30}$ alkyl and $R_4$ is hydrogen or $C_{12}$-$C_{30}$ alkyl; and
   wherein if the copolymer is the product of the polymerization reaction comprising (i) the alpha olefin monomer and the maleic anhydride monomer, $R_1$ is hydrogen and $R_2$ is $C_{24}$-$C_{30}$ alkyl.

* * * * *